July 19, 1960  K. PALLO  2,945,479
FLUID ENGINES
Filed May 31, 1957  4 Sheets-Sheet 1

Inventor
K. Pallo
By Glascock Downing Seebold
Attys

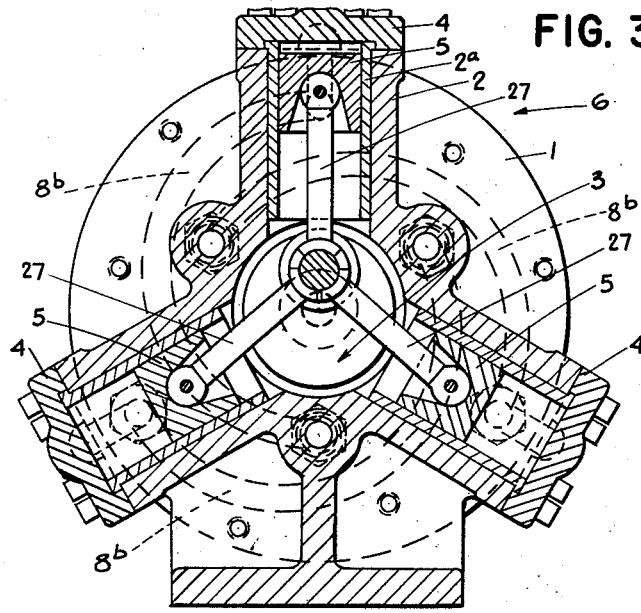
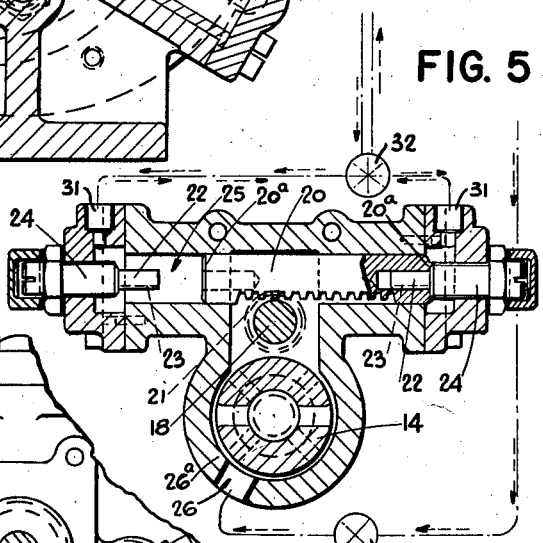
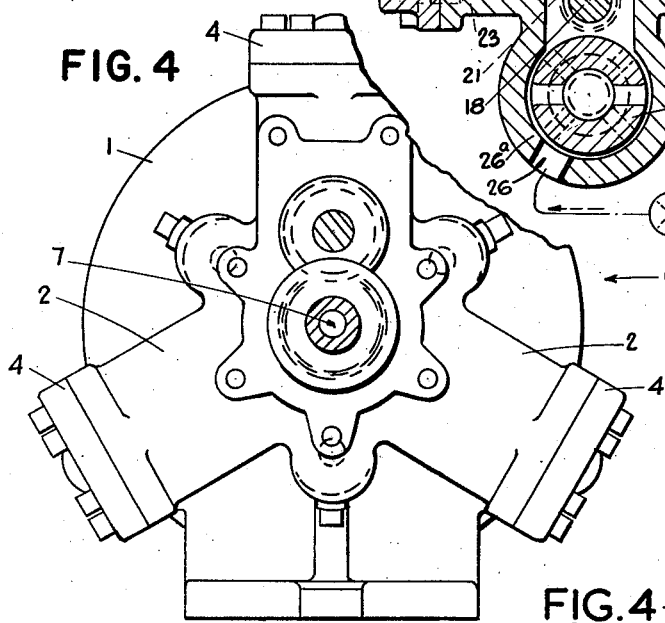

July 19, 1960 K. PALLO 2,945,479
FLUID ENGINES

Filed May 31, 1957 4 Sheets-Sheet 3

Inventor
K. Pallo

July 19, 1960

K. PALLO 2,945,479

FLUID ENGINES

Filed May 31, 1957

Inventor
K. Pallo

United States Patent Office 2,945,479
Patented July 19, 1960

2,945,479

FLUID ENGINES

Karl Pallo, 96 Courtenay Place, Wellington, New Zealand

Filed May 31, 1957, Ser. No. 662,658

Claims priority, application New Zealand June 8, 1956

13 Claims. (Cl. 121—120)

This invention relates to fluid engines intended for use in providing a drive for useful purposes and more particularly to fluid engines which are controllable as to speed and variable as to the direction of their drive.

An object of this invention is to provide an improved fluid motor which is controllable in its operation by a supply of fluid under pressure so that the engine is infinitely variable in its operation, and wherein the distribution of the fluid under pressure can be re-arranged to reverse or to change the direction of the drive of the engine.

According to this invention, the improved fluid engine comprises a body in which are radially disposed cylinders having pistons with connecting rods and a crank which is connected to a centrally arranged driven shaft, a fluid distributing means incorporated in the driven shaft and operably connected with the crank and the pistons, means for controlling a fluid supply from the fluid distributing means, fluid passage means for each cylinder and means for altering the arrangement of the fluid controlling means for changing the direction of the drive of the engine whereby operation of the fluid controlling means from one fluid passage means to another fluid passage means is effected to change the direction of rotation of the driven shaft and the amount of fluid supplied to the fluid distributing means controls the speed of the driven shaft.

The invention will now be described with reference to the accompanying drawings, in which:

Figure 3 is a sectional view on the line III—III of Figure 1.

Fig. 4 is a view on line IV—IV of Fig. 2.

Fig. 5 is a sectional view on line V—V of Fig. 1.

Figure 1:
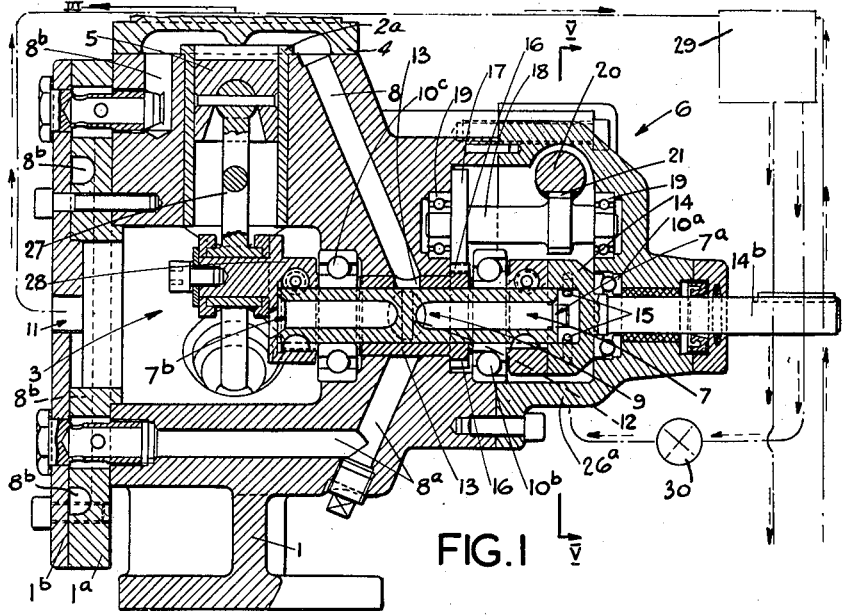
Figure 1 is a sectional view on the centre line of the engine.

In this invention the body 1 may be provided with a radial construction in which the cylinders 2 made therein are provided with sleeves 2a and the cylinders 2 are arranged so that they are radially situated through a central part of a crank case or chamber 3. The body 1 is provided with cylinder heads 4 arranged in association with each radially disposed cylinder 2 and the cylinder heads 4 are constructed to permit fluid to pass from the fluid distributing means along the fluid passage means to the cylinders 2 and pistons 5 therein, as required in the operation of the engine generally indicated by arrow 6 in a desired direction of a driven shaft 7. (See Figs. 1, 3 and 4.)

Figure 2:
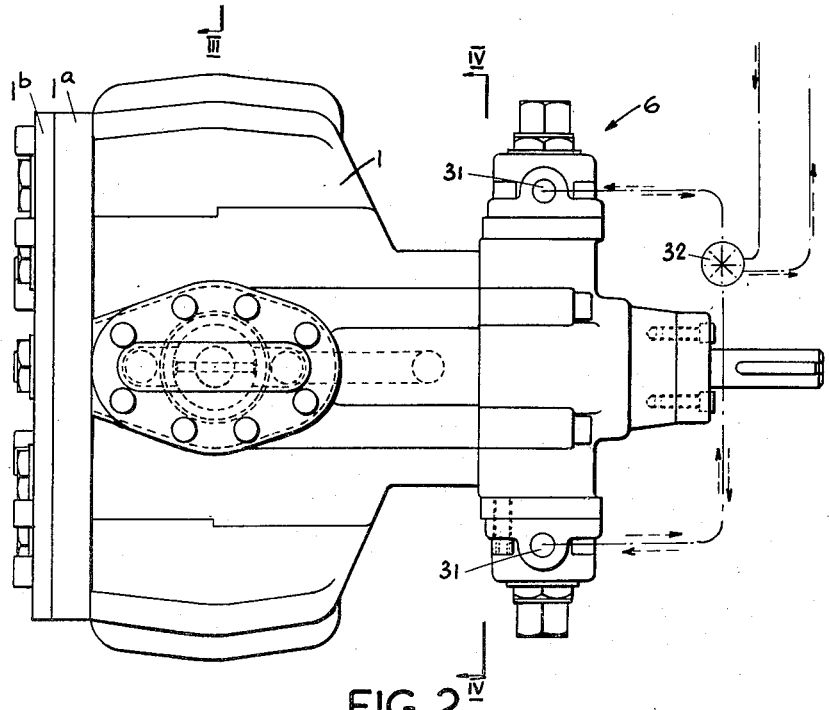
Figure 2 is a plan view of the engine.
Figure 6:
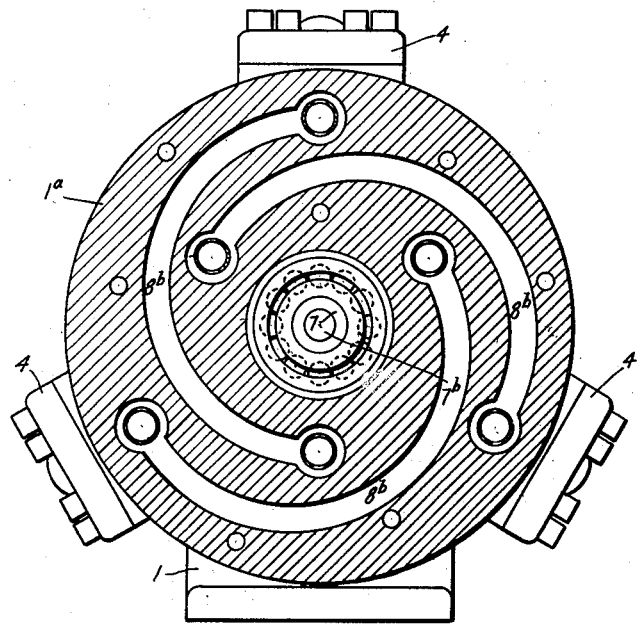
Fig. 6 is a sectional view of Fig. 1 showing the relationship of the passages 8b relative to the component 7.
Figure 7:
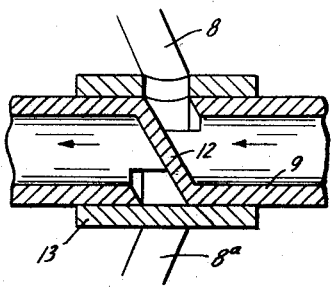
Fig. 7 is a vertical section of Fig. 1 showing the central portion of the distributing valve, the sleeve and sloping dividing wall 12.
Figure 8:
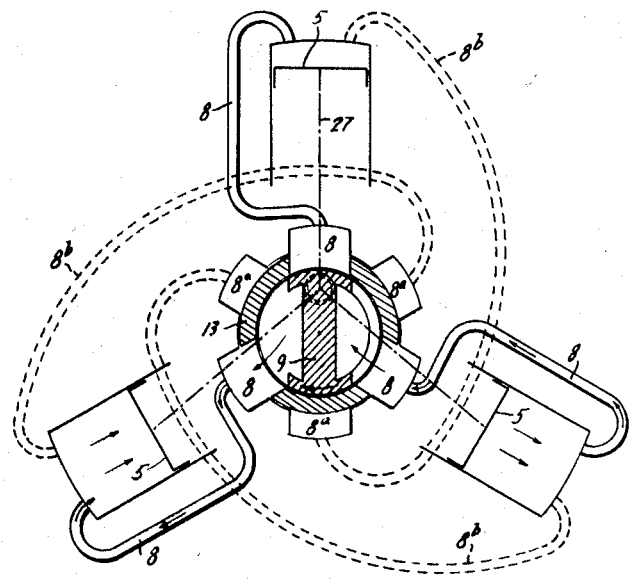
Fig. 8 is an end view of the distributing valve and ported sleeve with the connecting rod, bearing and crank pin removed, and diagrammatically represents the engine for operating in a clockwise direction.
Figure 9:
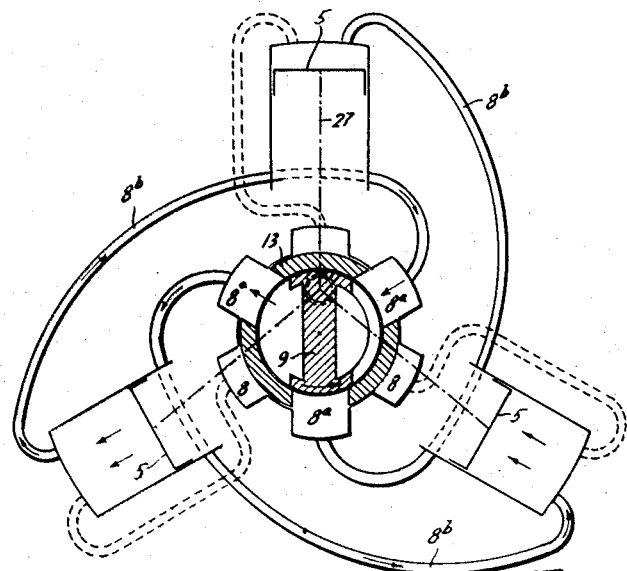
Fig. 9 is a similar view of Fig. 8 and represents the engine for operating in an anti-clockwise direction.

The body 1 is provided with a back plate 1a and a cover plate 1b, and the plates 1a, 1b complete the formation of the crank case 3 as illustrated in Fig. 1. The back plate 1a is provided with parts of one of the fluid passage means for each cylinder 2, whilst the cover plate 1b is provided with an outlet 11 through which fluid is exhausted from the crank case 3 of the engine 6, as illustrated in Figs. 1, 2 and 3.

Hence in this invention the body 1 is provided with a fluid passage means on one side of the cylinders 2 for the supply of fluid to the cylinders 2 and the pistons 5 to cause the driven shaft 7 to turn in a clockwise direction, or the fluid passage means on the other side of the cylinders 2 can be arranged for the passage of fluid to the cylinders 2 and piston 5 to cause the driven shaft 7 to turn in an anti-clockwise direction, see Figs. 1 and 3.

The fluid passage means on one side of the cylinders 2 for the supply of fluid to one side of the cylinders 2 comprises passages 8 as shown in Fig. 1, said passages 8 communicating from the fluid distributing means to one side of the cylinders 2 to operate the pistons 5 and cause the driven shaft 7 to turn in a clockwise direction. The fluid passage means for the supply of fluid to the other side of the cylinders 2 comprises passages 8a in the body 1 as shown in Fig. 1 and passages 8b formed or provided in the back plate 1a as shown in Figs. 1 and 3, and said passages 8b are arcuate in form, spirally arranged in relation to the driven shaft 7 and helically arranged in relation to each other, the passages 8a and 8b forming a communication from the fluid distributing means to the other side of the cylinders 2 to operate their pistons 5 and cause the driven shaft 7 to turn in an anti-clockwise direction.

In this invention the driven shaft 7 is hollow in formation and is supported in bearings 10 in the body 1 of the engine 6, and such bearings 10, being a thrust bearing 10a and a radial bearing 10C, support the driven shaft 7 in the body 1 and the driven shaft 7 is arranged to incorporate therein the fluid distributing means by which fluid is directed into the cylinders 2 or away from the cylinders 2 to an outlet 11 after the fluid under pressure has operated the pistons 5 in the cylinder 2, see Fig. 1.

Such distributing means may be in the form of a fluid distributing valve 9 of a walled by-pass type of circular formation and having a sloping dividing wall 12 which on one side directs fluid into the passage means and, on the other side, directs fluid from the passage means to an outlet 11. Surrounding the fluid distributing valve 9 is the fluid controlling means which may be a ported sleeve 13, and such ported sleeve 13 is arranged to be rotated through 180° to give a desired position and relationship of the fluid distributing valve 9 to the ported sleeve 13 for distributing fluid under pressure to the passage means for clockwise operation of the driven shaft 7, or to the other passage means for anti-clockwise operation of the driven shaft 7 (see Fig. 1).

The ported sleeve 13 surrounding and turning on the driven shaft 7 and about the distributing valve 9 therein is arranged to turn through 180° by operation of the means for altering the arrangement of the fluid controlling means. The driven shaft 7 is provided at its open inlet end 7a with a fluid connecting head 14 which has ports 15 whereby fluid under pressure is supplied through an inlet 26 and enters the fluid connecting head 14 through the ports 15 and passes centrally down the hollow driven shaft 7 to the fluid distributing means for passage to the cylinders 2 and their pistons 5 to move the latter and cause the turning of the driven shaft 7. On the return stroke of each piston 5, the fluid is passed back to the fluid distributing means which passes the fluid to an open outlet end 7b of the hollow driven shaft 7 where the fluid egresses through the open outlet end 7b to the crank case 3 of the engine 6, as shown in Fig. 1.

The fluid connecting head 14 with its ports 15 is attached to the open inlet end 7a of the hollow driven shaft 7, and is arranged between a thrust bearing 10a and an angular contact bearing 10b, see Figure 1, and the fluid connecting head is formed integrally with a forwardly projecting portion 14b aligned with the hollow driven shaft 7 so as to form an extension of the latter, said forwardly projecting portion 14b projecting beyond the body 1 to drive other means for performing useful purposes, as shown more particularly in Figure 1.

The ported sleeve 13 for the distributing valve 9 is driven through 180° by having a ring gear 16 attached to and carried by the ported sleeve 13, and the ring gear 16 is meshed with a pinion 17 near one end of a countershaft 18 situated in bearings 19 in the body 1 and near the distributing valve 9 (see Figure 1). The countershaft 18 with a second pinion 21, arranged near the other end, is driven by a rack 20 engaging with and driving the pinion 21, and in such arrangement the pinion 21 is integral with the countershaft 18, and the rack 20 is reciprocally supported to operate its pinion 21 on the countershaft 18. The rack 20 has ends 20a formed as pistons of hollow formation, or each end 20a of the rack 20 may be provided with a piston head of hollow formation, and each end 20a is operable on a shock absorbing projection 22 which is provided with bleed holes or grooves 23, so that fluid takes the shock of the operation of the rack 20 as the fluid bleeds back through the holes or grooves 23. Adjusting screws 24 entered from outside the body may be arranged to increase or shorten the throw of the rack 20 as required for accurate operation of the engine 6 to secure the maximum supply of fluid under pressure to the operating cylinders 2 and pistons 5 therein, see Figures 1 and 5. Hence in this invention the piston heads 20a of the rack 20 are entered into chambers 25 to which are supplied a fluid through inlets 31 (see Figures 2 and 5) to operate the rack 20 in one direction, and to prevent fluid escaping when the rack 20 is returned in the operation of the engine 6 to secure clockwise or anti-clockwise turning of the driven shaft 7. The operating fluid is supplied from a storage tank 29 through a by-pass valve 32, see Figures 2 and 5, where operation of the by-pass valve 32 directs the fluid to operate either hollow piston end 20a of the rack 20 as required to secure clockwise or anti-clockwise turning of the hollow driven shaft 7.

Hence the rack 20 is provided with a head 20a at each end with an adjusting screw 24, a chamber 25 having a port for the ingress, regress and egress of fluid for the movement of the rack 20 as desired for positioning the ported sleeve 13 about the distributing valve 9, for changing the travel or driving direction of the hollow driven shaft 7, as illustrated in Figures 1 and 5.

In such arrangement fluid under pressure is supplied through an inlet 26 to the intake chamber 26a or open inlet end 7a of the driven shaft 7 (see Figure 5), along the driven shaft 7 to the distributing valve 9 where the fluid under pressure is deflected by the inclined partition wall 12 of the distributing valve 9, to the fluid passage means and from such passage means to one of the cylinders 2 to operate a piston 5 therein, and the piston 5 reciprocated in the cylinder 2 moves its connecting rod 27 to operate a crank 28 mounted on the hollow driven shaft 7 which also forms the crank shaft for the crank 28 whereby the hollow driven shaft 7 is operated in a desired direction, see Figures 1 and 3.

Each piston 5 having reached the end of its stroke i.e., the end of its work stroke, then the piston 5 travels back along its cylinder 2 forcing the fluid out of the cylinder 2 to evacuate the latter so that the fluid is forced back along the fluid passage means into the distributing valve 9 and is then deflected by the inclined partition wall 12 of the distributing valve, along another portion of the hollow shaft 7 to the open outlet end 7b into the crank case or chamber 3, from whence the fluid is returned through the outlet 11 in the cover plate 1b, back to the storage tank 29 (see Figure 1) and the fluid is again placed under pressure by other compressing means such as a mechanical compressor (not shown).

The rate of rotation of the driven shaft 7 can be regulated by a control valve 30 for supplying a volume of fluid under pressure to the engine 6 so that the rotation is infinitely variable by the amount of fluid under pressure admitted to the engine 6, and furthermore, the torque of the engine 6 may be regulated by the pressure of the fluid supplied to the engine 6 and such pressure can be regulated by such control valve 30 independently of the engine 6, see Figures 1 and 5.

Hence the direction of rotation of the driven shaft 7 is controlled by the ported sleeve 13 which envelops the distributing valve 9 so that to effect an alteration of the direction of rotation of the driven shaft 7 the ported sleeve 13 is rotated through 180° around the distributing valve 9 by the turning of the ring gear 16 of the ported sleeve 13 such turning being effected by the turning of the pinion 21 on the countershaft 18 by the toothed rack 20 through the ends 20a or pistons at either end of the rack 20, and the rotation of the ported sleeve 13 directs the fluid under pressure into either one of the passage means to effect a desired direction of rotation of the engine 6 as required to perform useful work.

Hence in the operation of the engine 6 in accordance with this invention, fluid under pressure is supplied to the hollow driven shaft 7 and the fluid passes to the distributing valve 9 made integral with the shaft 7 or associated therewith, so that fluid under pressure is distributed through the distributing valve 9 to the fluid passage means and to the cylinders 2, that is the fluid is supplied to each cylinder 2 in turn as the distributing valve 9 is turned with the driven shaft 7, and operation of the pistons 5 in succession in their cylinders 2 ensures that each piston 5 receives an ingress of fluid and is operated by the fluid under pressure, and then on the return stroke of each piston 5, the fluid is regressed and returned back through the fluid passage means to the distributing valve 9 which leads the fluid through the hollow driven shaft 7, and the fluid enters the crank case 3, from whence the fluid is returned through the outlet 11 to a storage tank 29 (see Figure 1), whereby the fluid is placed under pressure again by a mechanical compressing means (not shown). At the same time fluid under pressure can be supplied to the rack 20 to drive the latter and thereby to effect turning of the ported sleeve 13 of the distributing valve 9 through 180°, and bringing about a reversal of the engine 6, in which case the ported sleeve 13 now ensures that fluid under pressure entering the distributing valve 9 is supplied to the passage means for anti-clockwise operation of the engine 6 and the driven shaft 7 in that the fluid under pressure is supplied to the cylinders 2 and the pistons 5 which, previously to effecting turning of the ported sleeve 13, were exhausting the fluid to the outlet 11.

Then a supply of fluid under pressure on the other head of the rack 20 moves the latter to restore the direction of drive of the driven shaft 7 to a clockwise operation.

The improved engine 6 not only ensures the operation of a driven shaft 7 in a desired direction, but also its continuous operation, first in one direction and then in the other as may be required where the driven shaft 7 is coupled for performing useful work as may be required first in one direction and then in the other direction, in the operation of machines or otherwise in the performance of other machines, or to drive machines, machine tools, auxiliary mechanisms, mechanical devices and any desired appliances where slow movement is desired in either direction of rotation of a driven shaft 7.

What I do claim and desire to obtain by Letters Patent of America is:

1. A fluid engine comprising a body, radially disposed cylinders in said body, a piston in each cylinder, a centrally located driven shaft capable of rotation in opposite directions, a connecting rod and crank means operably connecting each piston to the driven shaft, a fluid distribution means incorporated in the driven shaft, means for controlling a fluid supply from said fluid distributing means, means defining one set of passages for the supply and exhaust of fluid to and from the cylinders for one direction of rotation of said driven shaft, and means defining another set of passages for the other direction of rotation of the shaft whereby the direction of rotation of the driven shaft can be reversed by moving said controlling means from a position in which fluid is supplied and exhausted to and from said one set of passages to a position in which fluid is supplied and exhausted to and from said another set of passages.

2. A fluid engine as claimed in claim 1, in which said crank means is attached to the driven shaft with said driven shaft constituting a crankshaft for the crank means and said driven shaft being hollow for the distribution of the fluid to and from the cylinders during the operation of the engine.

3. A fluid engine as claimed in claim 2, wherein said fluid distribution means is a fluid distribution valve means formed integrally with and incorporated in the driven shaft and operably connected with the crank means and the pistons, an outlet, and said fluid distribution valve means passing and directing fluid to either set of passages for the supply and exhaust of fluid to and from the cylinders and from either set of passages to said outlet.

4. A fluid engine as claimed in claim 3, in which said fluid distribution valve means includes a sloping wall means dividing the hollow driven shaft whereby the wall means on one side thereof directs fluid into a passage of said one set of passages for the supply and exhaust of fluid to and from the cylinders and on the other side thereof directs fluid from another passage of said one set of passages to said outlet.

5. A fluid engine as claimed in claim 4, in which one set of passages is arranged in the body on one side of the cylinders for the supply and exhaust of fluid to and from the cylinders to move the pistons therein for turning the driven shaft in a clockwise direction, and another set of passages being arranged on the other side of the cylinders for the supply and exhaust of fluid to and from the cylinders to move the pistons therein for turning the driven shaft in a counter-clockwise direction.

6. A fluid engine as claimed in claim 5, in which said another set of passages includes passage means arcuately formed and arranged in relation to the driven shaft in a spiral-like formation.

7. A fluid engine as claimed in claim 1 wherein said controlling means includes a ported sleeve surrounding the fluid distributing means, and means for rotating said sleeve through 180° to position said sleeve properly relative to either of said set of passages.

8. A fluid engine as claimed in claim 1, in which means for moving the controlling means includes a reciprocably mounted rack, a counter-shaft journalled in the body adjacent the fluid distributing means, a pinion on the counter-shaft meshing with the rack, a ring gear carried by the fluid controlling means, and a further pinion on the counter-shaft meshing with the ring gear to turn said gear as the rack is reciprocated.

9. A fluid engine as claimed in claim 8, in which said rack includes end portions defining pistons, chamber means in which said end portions operate and means for supplying fluid to said chambers to operate the rack in one direction and prevent fluid escaping when the rack is returned during operation of the engine to effect clockwise or counter-clockwise rotation of the driven shaft.

10. A fluid engine as claimed in claim 9, wherein said pistons are of hollow formation and further including a shock absorbing projection on which each hollow piston end is operable, and each projection having bleed openings whereby the fluid absorbs the shock of the operation of the rack as the fluid bleeds back through the bleed openings.

11. A fluid engine as claimed in claim 10, in which each projection is integral with an adjusting screw manipulatable exteriorly of the body so that the engagement between the hollow piston end and the projection can be adjusted to increase or decrease the throw of the rack.

12. A fluid engine as claimed in claim 1, wherein said driven shaft is hollow and provided with an open inlet end and an open outlet end, a fluid connecting head at said inlet head and having ports whereby fluid enters the head and passes centrally of the hollow driven shaft to the fluid distributing means to be supplied to the cylinders and pistons to move the latter and effect turning of the hollow driven shaft, and the fluid being exhausted back to the fluid distributing means for passage to and through the open outlet end.

13. A fluid engine as claimed in claim 12, further including a forwardly projecting portion integrally formed with the fluid connecting head and aligned with the driven shaft to define an extension of said shaft, with said projecting portion extending exteriorly of the body to serve as a drive means.

References Cited in the file of this patent

UNITED STATES PATENTS

| | | |
|---|---|---|
| 671,739 | Vaders | Apr. 9, 1901 |
| 690,743 | La Burt | Jan. 7, 1902 |
| 727,772 | Fenton | May 12, 1903 |
| 736,438 | Philips | Aug. 18, 1903 |
| 2,246,074 | Joy | June 17, 1941 |
| 2,326,464 | Jones | Aug. 10, 1943 |

FOREIGN PATENTS

| | | |
|---|---|---|
| 454,411 | France | Apr. 26, 1913 |